United States Patent

Durin

[11] Patent Number: 5,899,041
[45] Date of Patent: May 4, 1999

[54] SUPPORTING MEMBER FOR LATTICE STRUCTURES

[75] Inventor: Michel Durin, Saint Cyr L'Ecole, France

[73] Assignee: Metal Deploye S.A., Montbard, France

[21] Appl. No.: 08/676,348

[22] PCT Filed: Dec. 1, 1995

[86] PCT No.: PCT/FR95/01584

§ 371 Date: Jul. 19, 1996

§ 102(e) Date: Jul. 19, 1996

[87] PCT Pub. No.: WO96/17143

PCT Pub. Date: Jun. 6, 1996

[30] Foreign Application Priority Data

Dec. 1, 1994 [FR] France .................................. 94 14435

[51] Int. Cl.$^6$ .................................................. E04C 3/09
[52] U.S. Cl. ................ 52/660; 52/662; 52/677; 52/733.3; 52/731.1; 211/126.1; 211/181.1
[58] Field of Search ................ 52/660, 662, 667, 52/672, 677, 724.3, 733.3, 731.7, 335, 737.1; 211/181.1, 182, 106, 183, 126.1; 256/59, 65, 32, 33, DIG. 5; 312/365.1, 365.4, 111

[56] References Cited

U.S. PATENT DOCUMENTS

| | | | |
|---|---|---|---|
| 200,153 | 2/1878 | Sickles | 256/32 X |
| 1,250,588 | 12/1917 | Kahn | 52/672 X |
| 3,894,370 | 7/1975 | Parazader | 52/335 X |
| 4,073,112 | 2/1978 | Leiblich | 52/677 |
| 4,109,797 | 8/1978 | Brunette | 211/126.1 X |
| 5,315,803 | 5/1994 | Turner | 52/657 X |
| 5,384,937 | 1/1995 | Simon | 211/181.1 X |

FOREIGN PATENT DOCUMENTS

| | | |
|---|---|---|
| 0 258 157 | 3/1988 | European Pat. Off. . |
| 0 596 207 | 5/1994 | European Pat. Off. . |
| 379 668 | 11/1907 | France . |
| 2 418 313 | 9/1979 | France . |
| 2 697 690 | 5/1994 | France . |
| 134830 | 8/1899 | Germany . |
| 2 641 667 | 3/1978 | Germany . |
| 2 819 631 | 11/1979 | Germany . |
| 441 683 | 1/1968 | Switzerland . |
| 125748 | 4/1919 | United Kingdom . |

Primary Examiner—Carl D. Friedman
Assistant Examiner—Winnie S. Yip
Attorney, Agent, or Firm—Young & Thompson

[57] ABSTRACT

A supporting element for lattice structures comprises at least one channel shaped structural section including an endwall flanked by obliquely oriented adjoining wings. Regularly longitudinally spaced securement notches are provided for securing lattice or wire cable trays the supporting element. The notches comprise longitudinally extending cutouts in each of the wings. The cutouts are defined by longitudinal and lateral edges in the wings. Regularly spaced lands extend between successive notches. Tongues longitudinally extend from the lands and partly overlying the notches. Gaps are defined between free edges of the tongues and adjacent lands. The tongues are bendable from a position generally in alignment with associated lands to a deformed position extending into the notches for restraining a section of the components between an underface of the tongues and the edges in the wings. According to a preferred embodiment two such channels shaped structural sections are joined by a common basewall to define a one-piece omega-shaped section. An X-shaped beam is also provided comprising omega-shaped sections fixed together at their basewalls.

7 Claims, 3 Drawing Sheets

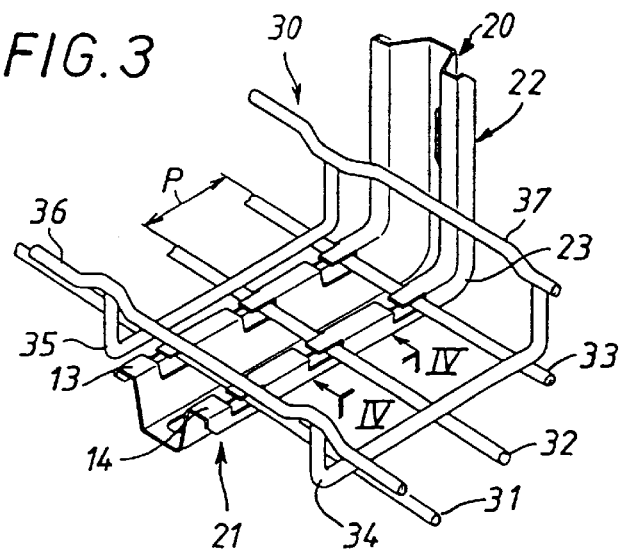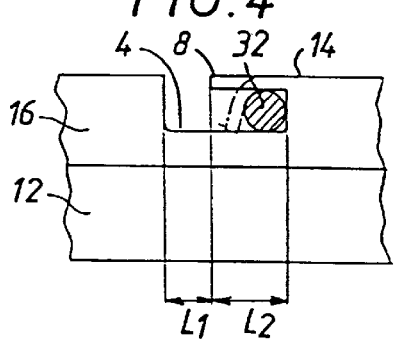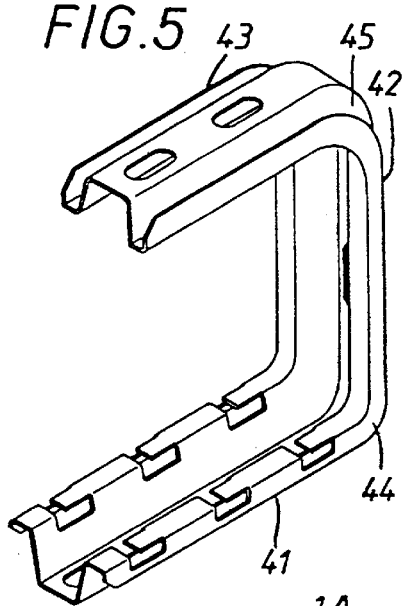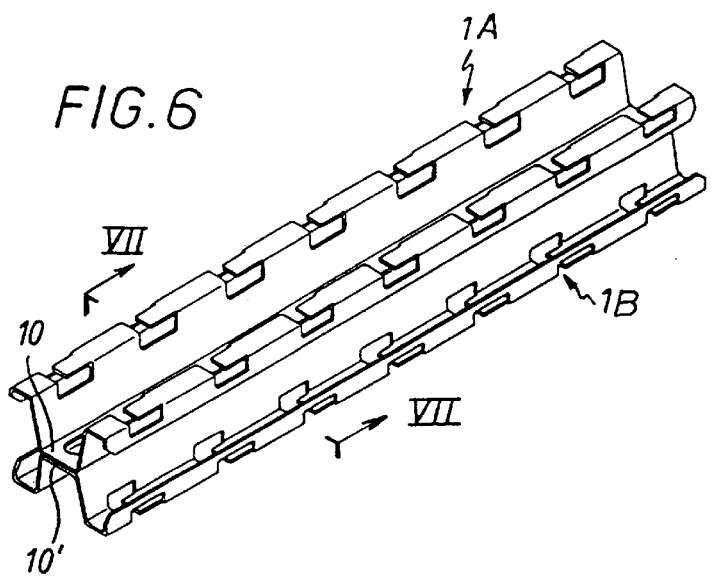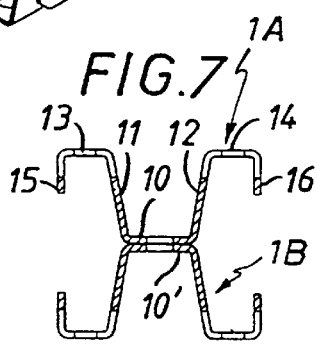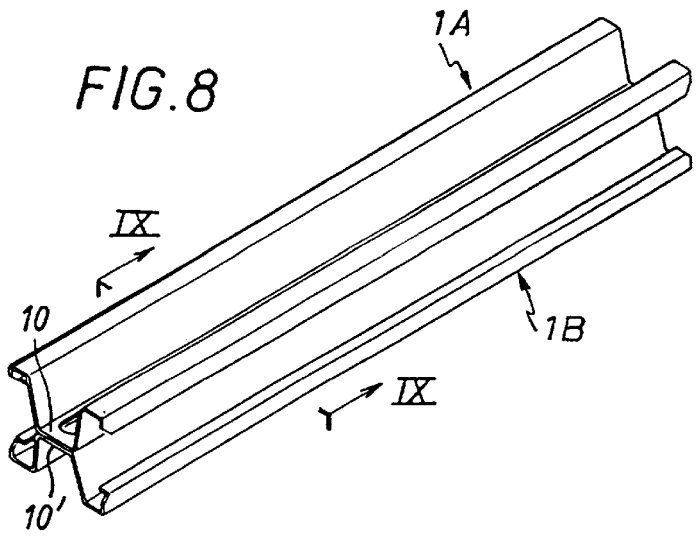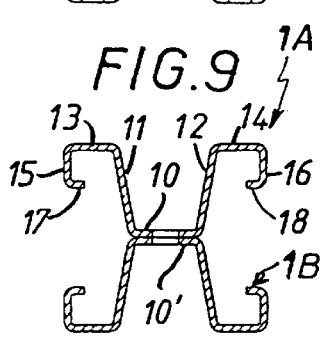

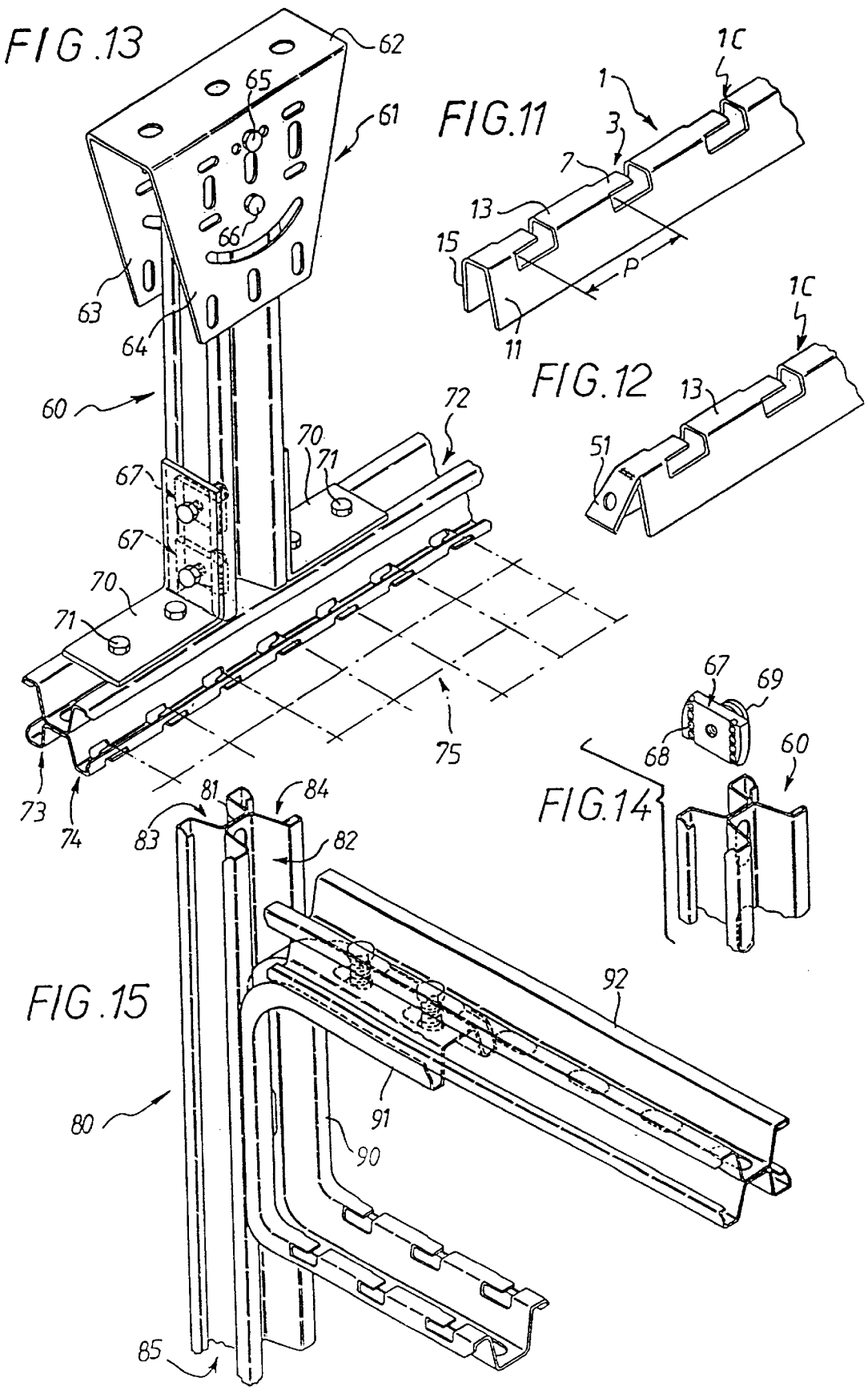

SUPPORTING MEMBER FOR LATTICE STRUCTURES

BACKGROUND OF THE INVENTION

1. Field of the Invention

The present invention relates to supporting elements for lattice structures of the type comprising securement means adapted to receive spaced elongated components of the structure to be supported. Such lattice structures are of all types, such as welded or otherwise assembled elongated elements of the wire or rod type for use as cable trays and industrial equipment, in partitions, for the building industry, inter alia.

Depending on the use, the carrier surfaces of such lattice structures can have various orientations and require suitable securement means adapted for more or less complicated constructions and/or uses; it may also involve securement, on wall brackets, hangers, suspensions, members and the like.

2. Summary of the Invention

The present invention provides in this context a supporting element adapted to the most diverse uses and configurations with great facility of use.

According to one aspect of the invention, there is provided a section in the form of a channel with notches for securement with cut outs on opposite sides along the edges of the end wall thereof, tongues from end wall overlying the notches and extending along a fraction of the length thereof.

The notches thus defined and surmounted by the tongues cut out from the end wall surface of the profile, constitute recesses suitable, owing to their dimensions and their spacing, for receiving longitudinally-extending components, wires or rods, of the lattice structure to be supported.

For vertical orientation the lattice structure, it can simply bear under the force of gravity in the recesses of the supporting element. In any event, the securement of the lattice structure in the notches can be ensured by merely bending the tongues against the components received in the recesses.

According to a preferred arrangement of the invention, the channel-shaped profiles are arranged in pairs along the wings of a generally omega shape.

There is thus provided a structural element offering remarkable performance as regards mechanical strength in beams.

The structural section or profile can preferably be bent once or twice for the formation a bracket or of a suspension element, securement perforations being provided for the mounting on a vertical or horizontal wall, the arrangement of the supporting notches being in this case provided in a portion or portions of the structural section or profile.

According to another aspect of the invention, there is provided a pair of two structural sections or profiles of omega shape, assembled back-to-back thereby to form a structural element which is even stronger, for use as a beam or a post with the possibility of access on four sides. In this case the structural section or profile need not comprise notches and tongues over its entire extent and may in fact be eliminated.

BRIEF DESCRIPTION OF THE DRAWINGS

The characteristics and advantages of the invention will be further apparent form the description which follows, by way of example, with reference to the accompanying schematic drawings, in which:

FIG. 3 is a perspective view of an arrangement of a support bracket for a cable tray or trough;

FIG. 4 is a cross-sectional view on the line IV—IV of FIG. 3;

FIG. 5 is a perspective view of an arrangement of double bracket;

FIG. 6 is a perspective view of an assembly of two structural sections or profiles back-to-back;

FIG. 7 is a cross-sectional view on the line VII—VII of FIG. 6;

FIG. 8 is a perspective view of a modification of the double structure shown in FIG. 6;

FIG. 9 is a cross-sectional view of the double structure of FIG. 8;

FIG. 11 is a perspective view of a length of a single channel structural section of profile;

FIG. 12 shows a similar section provided with a securement tongue;

FIG. 13 shows in perspective an arrangement forming a hanger;

FIG. 14 shows details of a securement member incorporated in the arrangement of FIG. 13;

FIG. 15 shows an embodiment with a double bracket similar to that of FIG. 5 for mounting on a post constituted by the carrying element of FIG. 8.

DESCRIPTION OF THE PREFERRED EMBODIMENTS

Figure 1:
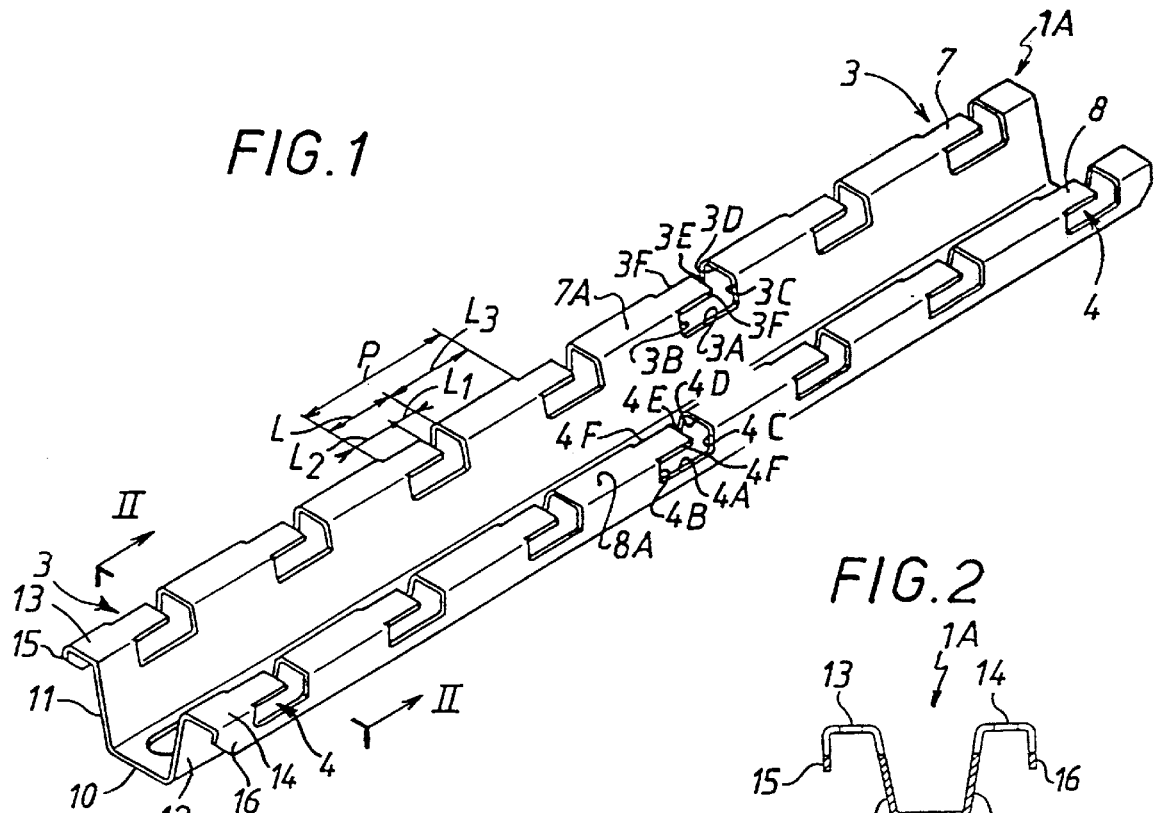
FIG. 1 is a perspective view of a structural section or profile embodying the invention.
Figure 2:
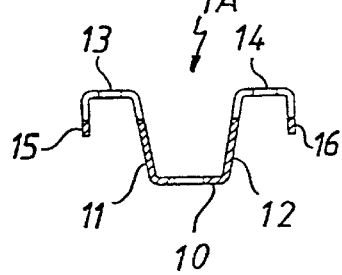
FIG. 2 is a cross-sectional view on the line II—II of FIG. 1.

According to the preferred embodiment shown in FIGS. 1 and 2, a support element according to the invention is constituted by a profile or structural section 10 of generally inverted omega shape 52 with a flat bottom base wall between two lateral flaring oblique surfaces or wings 11, 12, each of the flaring surfaces is connected to a respective end wall 13, 14 which is connected to a turned-down flange edge or wing 15, 16, whereby channel sections are spaced above the base wall 10 and open downwardly in the direction of the base wall to each side thereof.

Figure 10:
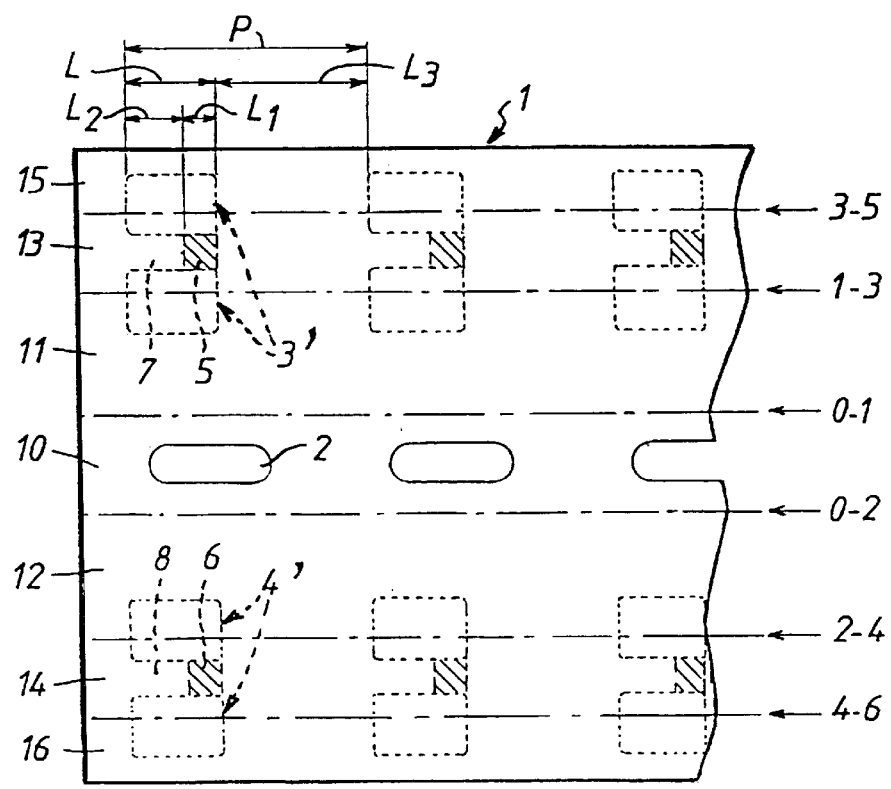
FIG. 10 is a schematic view of a step in the production by profiling of a section of profile according to FIG. 1.

FIG. 10 shows how such a profile is formed by profiling from a strip 1 of sheet metal of corresponding width, the broken lines indicated by 0-1, 0-2, 1-3, 2-4, 3-5, and 4-6 indicating the bend lines between adjacent regions. Prior to forming a series of aligned perforations 2 will be cut out from base wall section 10 and, on either side of the base wall section, along bend lines 1-3, 3-5, and the bend lines 2-4, 4-6, rectangular regions indicated at 3 and 4, of a certain length L will be cut out, the cut out portions are adapted to be detached during bending and to define in each of the channel profiles to corresponding notches 3, 4, as shown in FIG. 1, spaced at predetermined distances or intervals P.

After bending, cut outs in the end walls 13 and 14 of rectangular sections 5, 6 and a length L1 are made so as to provide corresponding flat tongues 7, 8 extending along a part of the length L designated L3 of each notch.

It will therefore be seen that the supporting element thus has in the end walls of each of the channels base, a series of notches 3, 4 of length L, spaced a distance interval P from one another. Each of the notches has an overlying tongue 7, 9 cut out from 13, 14 of the channels.

In the embodiment shown in FIGS. 3 and 4, such a supporting element is defined on only one of the branches of a profile or structural member having two branches 21, 22 at right angles on opposite sides of an elbowed region 23, only branch 31 being notched. In this embodiment, in each of the end walls 13, 14 of the channels, there is a series of three notches to receive respectively the three "warp" or longitudinal wires 31, 32, 33 of a section of cable tray 30 of lattice construction in which said warp or longitudinal wires are in the usual way welded to the "weft" or transverse wires 34, 35 and bear the warp wires 36, 37 defining the free edges of the sides of the cable tray.

As is seen in FIG. 4, each associated warp wire such as 32 is disposed in a corresponding notch, such as notch 4, and the corresponding tongue 8 can be bent down if desired against the wire thus received to ensure its securement. Each of the notches 3, 4 comprises a pair of lateral edges in the respective wings 11, 15, 12, 16. One of the lateral edges 3B, 3C, 4B, 4C is located at the junction between the associated tongue 7, 8 and the adjacent land 7A, 8A of the end wall 13, 14. The other lateral edge 3C 4C is in alignment with the edge 3D, 4D, defining the edge of the next adjacent land remote from the tongue. A longitudinal edge 3A, 4A extending longitudinally in the wings between the spaced lateral edges 3B, 3C, 4B, 4C. The edge of the tongue 3E, 4E extends transversely between longitudinal edges 3F, 4F of the tongue and is parallel and spaced from the edge 3D, 4D, defining the edge of the next adjacent land.

Locking by means of tongues permits immobilization of any wire or rod components, whether square or other cross section provided that their transverse dimension does not exceed the depth of the notch. Locking is effected by bending or deformation of the tongue inwardly into the notch so that it mates along a generatrix of the elongated wire or rod like component or wire by blocking the same against the longitudinal edges 3A, 4A.

In this embodiment of FIG. 3, the bracket 20 is adapted to be secured e.g. by bolting, its unnotched leg 22 against a vertical support wall.

FIG. 5 shows an embodiment of double bracket structure with three legs 41, 42, 43 interconnected by right angled bend areas 44, 45. Here again, only a leg, namely leg 41 is notched, the securement of the leg 43 to any horizontal support surface, ceiling or the like is possible.

However, the example of use for a cable trough is in no way limiting, as the support element according to the invention is adapted for mounting all types of lattice structures, with openings comprising longitudinal elements of the wire or rod type whether cylindrical or of any cross section. The longitudinal elongated components or elements, and the transverse components or elements fixed to each other at crossing points by welding or other means. It is particularly suitable for structures, decorations, partitioning, false ceilings, and the like with suitable adaptations of the parameters of the system according to the invention, namely the access passages L1 provided between the free transverse edges 3E 4E of the tongues and the opposed edge 3D, 4D of the adjoining land (which will correspond substantially to the longitudinal dimensions of the notches), the total length L of the access passages L1 and the tongue length L3 and the pitch or spacing P of the notches and tongues.

The perforations 2 provided in the base walls 10 of the omega shaped profile permit securement on any support: walls, ceilings, beams, floors, but are also suitable for the assembly of two profiles 10, 10' according to the embodiment of FIGS. 6 and 7, by bolting, electric spot welding or rowelling. The assembly thus constituted thus forms an X-shaped beam or structural element which has particularly preferred characteristics from the point of view of mechanical strength, but also from the point of view of functional possibilities.

The X-shaped structural section as illustrated particularly in FIG. 7 offers the possibility of securement on four sides and can preferably be used as a beam in a structural assembly; and particularly as a support in a cable trough installation of the "suspended" type.

A development of the X-shaped structural section is shown in FIGS. 8 and 9, where will be seen wings 11, 15 and 12, 16, in turned flanges 17, 18 constituting a four-sided structure of the "caisson" type with shaped section on pairs of opposite surfaces anchoring rail. This arrangement opens the possibilities of providing supporting structures or suspension units for the securement of "heeled" brackets.

The invention thus opens great possibilities for developments and uses in various fields, as will be pointed out hereinafter with reference to FIGS. 11 to 15.

First will be considered a simplified embodiment of the supporting element according to the invention as illustrated in FIGS. 11 and 12.

In the preceding embodiments the supporting elements had an omega shaped profile structural section. In FIGS. 11–12, the supporting element is in the form of a single channel with two wings 11, 15 symmetrically arranged on opposite sides of the flat end wall 13. The two wings of the profile can be of equal length or of different lengths as in the preceding embodiments. These two wings are not necessarily symmetrical, neither in lengths nor in shape nor as to angle. The channel section could also form a part of a structural profile of generally tubular shape. But in all cases, as the tongues 7 cut out from the end wall are deformed inwardly, they will never project and will never therefore snag or harm objects such as cables or the like which slide in contact with the inner surface of the supporting element.

Such a supporting element can be supported and secured by any means known per se in any spacial position, horizontally, vertically or otherwise, with the lattice structure, being self-supporting or suspended. Thus, by way only of example, the supporting element of the FIG. 12 embodiment is provided at one extremity with a securement tongue 51 formed as an extension of the outermost band of the end wall 13, which may be ben if desired, and pierced with at least one hole for securement on any associated support in vertical, horizontal, or inverted position or even in some other position.

FIG. 13 shows a hanger type support comprising a section 60 of double omega section of the type illustrated in FIG. 8 descending vertically from a suspension member 61 of stirrup shape comprising a base wall 62 pierced by holes for securement by bolts or long screws for example to a ceiling structure or to a post or the like (not shown), and two flanks 63, 64 receiving suspension pins 65, 66 coacting with perforations (not illustrated) in the flat base walls of the omega shaped sections 60. As is shown in the cross-sectional view of FIG. 9, on opposite sides of omega-shaped section base walls and at the end of the wings 11 and 12 a four-sided caisson structure forming two pairs of opposed anchoring rails. In this case the section 60 has no notches or tongues.

In the embodiment illustrated in FIGS. 13 and 14, these anchoring rails are used in pairs for fixing an angle member 70 on each side by means of securement tabs 67 provided with grooves 68, and optionally with notches (shown here).

The grooves come into bearing relation against retaining surfaces such as defined by wings 15 of the caissons by means of in-turned flanges such as 17 and securement nuts 69. The two angle members thus secured spatially are suitable for example for mounting by means of bolts 71 on a post 72 also of double omega shape, but of the type shown in FIG. 7, with the formation at the edge of only the lower wings of the omega-shaped section of supporting elements 73, 74 with notches and tongues such as described above, for a lattice structure 75 schematically shown in broken lines and which can be part of a ceiling unit for example.

FIG. 15 shows an embodiment with an X-shaped beam section 80 as illustrated in FIGS. 8 and 9. Thus, there is provided on opposite sides of the double base wall 81 resulting from back-to-back securement of the omega shaped recesses, two opposed recesses 82, 83 of flared channel section shape and, on either side of these recesses, two pairs of caissons 84 and 85 adapted to form anchoring or sliding rails for sliding members of corresponding shape having securement tabs 67 as described above.

In the embodiment of FIG. 15, only one lateral recess 82 is used for receiving and securement by bolting (not shown) of U-shaped bracket 90 similar to that of the FIG. 5 embodiment with an X-shaped structural section 92 similar to that of the post 80 but in horizontal position and mounted on the upper branch or leg of the U-shaped bracket.

Thus, the double omega profile according to the invention provides mounting means for members to be supported in four different directions. There is thus available, first, a pair of flaring channels with joined base walls, as in the case of the channels indicated at 82 and 83 in the FIG. 15 embodiment. Second, there is another pair of channels perpendicular to one of flaring channels 82, 83 which form anchoring rails 84, 85 as shown.

Of course the invention is not limited to the details of construction described above simply by way of illustration. It is particularly to be noted that the supporting element and the beam structures can be of metallic or non-metallic material, for example a deformable plastic material, or any other material having sufficient mechanical strength to be deformed and to retain its shape after deformation.

I claim:

1. Assembly comprising at least one wire cable tray having a lattice structure of longitudinal and transverse wirelike or rodlike elongate components having a transverse dimension and a supporting element supporting said at least one wire cable tray, said supporting element comprising at least one channel shaped structural section including an endwall flanked by outwardly extending adjoining wings, regularly longitudinally spaced securement notches securing said components to the supporting element, said notches comprising longitudinally extending cutouts in each of the wings, the cutouts accommodating said transverse dimension of the elongate components, said cutouts being defined by longitudinal and lateral edges in the wings, regularly spaced lands extending between successive notches, tongues longitudinally extending from said lands and partly overlying said notches, gaps defined between free edges of said tongues and opposed transverse edges of adjacent lands, said gaps having a longitudinal dimension greater than the transverse dimension of the components for enabling insertion of the components into the notches, said tongues being bendable from an initial position generally in alignment with associated said lands to a deformed securement position extending into the notches for restraining a section of one of the longitudinal components between the underface of the tongue and portions of said edges in said wings defining the cutouts.

2. Assembly according to claim 1 wherein said supporting element comprises two said channel shaped structural sections defining a resultant generally omega-shaped structural section, adjacent wings of the respective channel shaped structural sections being joined by a common basewall.

3. An X-shaped beam member for supporting lattice structures including wire cable trays and comprised of wirelike or rodlike elongate components having a transverse dimension, said beam member comprising a pair of generally omega-shaped structural sections fixed back to back to each other along respective basewalls, each of said omega-shaped structural sections including a pair of channels shaped structural portions including an endwall flanked by wings, one of said wings of each of said channels being joined to the basewall of each of said omega-shaped structural sections, the channel shaped structural portions of each of said omega-shaped structural sections being arranged symmetrically relative to said basewall, each of said channel shaped portions having regularly longitudinally spaced securement notches for securing sections of components to the supporting element, said securement notches of the channel shaped structural portions of each of said omega-shaped structural section being transversely aligned with each other.

4. A beam member according to claim 3, wherein said notches comprise longitudinally extending cutouts in each of the wings, the cutouts being deep enough to accommodate the transverse dimension of the elongate components, said cutouts being defined by longitudinal and lateral edges in the wings, regularly spaced lands extending between successive notches, tongues longitudinally extending from said lands and partly overlying said notches, said tongues having an overface, an underface, a pair of longitudinal edges and a free transverse edge therebetween gaps defined between free edges of said tongues and opposed transverse edges of adjacent lands, said gaps having a longitudinal dimension greater than the transverse dimension of the components for enabling insertion of the components into the notches, said tongues being bendable from a position generally in alignment with associated said lands to a deformed securement position extending into the notches for restraining, a section of the components between an underface of the tongues and portions of said edges in said wings defining the cutouts.

5. Beam member according to claim 4, wherein said basewalls are generally flat and comprise longitudinally spaced mounting perforations.

6. Beam member according to claim 4, wherein said omega-shaped structural sections are permanently fixed to each other.

7. Beam member according to claim 4, wherein said omega-shaped structural section are removably fixed to each other.

* * * * *